US012253822B2

(12) United States Patent
Komori et al.

(10) Patent No.: US 12,253,822 B2
(45) Date of Patent: Mar. 18, 2025

(54) IMAGE FORMING APPARATUS AND CONTROL METHOD OF IMAGE FORMING APPARATUS

(71) Applicant: BROTHER KOGYO KABUSHIKI KAISHA, Nagoya (JP)

(72) Inventors: Ayaka Komori, Nagoya (JP); Keita Suzuki, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/311,595

(22) Filed: May 3, 2023

(65) Prior Publication Data

US 2024/0004344 A1 Jan. 4, 2024

(30) Foreign Application Priority Data

Jun. 29, 2022 (JP) ................................ 2022-104912

(51) Int. Cl.
*G03G 21/20* (2006.01)
*G03G 15/16* (2006.01)

(52) U.S. Cl.
CPC ....... *G03G 21/203* (2013.01); *G03G 15/1665* (2013.01)

(58) Field of Classification Search
CPC ........... G03G 15/1675; G03G 15/1605; G03G 15/1615; G03G 15/1645; G03G 21/203; G03G 15/205; G03G 15/1665
See application file for complete search history.

(56) References Cited

U.S. PATENT DOCUMENTS

| | | | | |
|---|---|---|---|---|
| 9,341,994 B2 * | 5/2016 | Kanehara | G03G 15/1675 | |
| 2014/0056604 A1 * | 2/2014 | Hayakawa | G03G 15/50 | 399/66 |
| 2014/0119761 A1 * | 5/2014 | Matayoshi | G03G 15/1675 | 399/66 |
| 2015/0185668 A1 * | 7/2015 | Matsuzaki | G03G 15/1645 | 399/315 |
| 2019/0025742 A1 * | 1/2019 | Kagawa | G03G 15/5054 | |

FOREIGN PATENT DOCUMENTS

| | | |
|---|---|---|
| JP | 2000-187397 A | 7/2000 |
| JP | 2002-139929 A | 5/2002 |
| JP | 2003-280302 A | 10/2003 |
| JP | 2014-44332 A | 3/2014 |

* cited by examiner

*Primary Examiner* — Jessica L Eley
(74) *Attorney, Agent, or Firm* — Merchant & Gould P.C.

(57) ABSTRACT

A transfer nip is formed between a transfer member and a photosensitive drum. The transfer member is configured to transfer a toner image formed on the photosensitive drum to a sheet that passes through the transfer nip. A humidity sensor is configured to detect humidity. A sheet sensor is arranged upstream of the transfer member in a sheet conveyance direction. The sheet sensor is configured to detect a trailing end of the sheet. A controller is configured to: in response to an elapse of a particular period after the sheet sensor detects the trailing end of the sheet, change a transfer bias to be applied to the transfer member from a first transfer bias to a second transfer bias, the second transfer bias having a smaller absolute value than the first transfer bias; and change the particular period based on the humidity detected by the humidity sensor.

20 Claims, 11 Drawing Sheets

FIG. 10

| ENVIRONMENT | TYPE OF SHEET | | PERIOD ΔT [ms] | | | |
|---|---|---|---|---|---|---|
| | | | −20 | −30 | −35 | −40 |
| HIGH TEMPERATURE AND HIGH HUMIDITY | FIRST SHEET | BANDING | D | D | D | D |
| | | BLURRING AT TRAILING END [mm] | 0 | 0 | 0 | 0 |
| | SECOND SHEET | BANDING | B | B | A | A |
| | | BLURRING AT TRAILING END [mm] | 0 | 0 | 0 | 3.5 |
| | THIRD SHEET | BANDING | D | D | D | D |
| | | BLURRING AT TRAILING END [mm] | 0 | 0 | 0 | 0 |
| NORMAL TEMPERATURE NORMAL HUMIDITY | FIRST SHEET | BANDING | C | C | B | A |
| | | BLURRING AT TRAILING END [mm] | 1.5 | 1.5 | 1.5 | 1.5 |
| | SECOND SHEET | BANDING | B | A | A | A |
| | | BLURRING AT TRAILING END [mm] | 1.5 | 3 | 3.5 | 6 |
| | THIRD SHEET | BANDING | C | C | B | A |
| | | BLURRING AT TRAILING END [mm] | 1.5 | 1.5 | 1.5 | 1.5 |

FIG. 11A

| VA | |
|---|---|
| FIRST SPEED | SECOND SPEED |
| −35 | −25 |

FIG. 11B

| VB | | | |
|---|---|---|---|
| THIN | NORMAL | THICK | THICKER |
| −5 | 0 | 0 | 5 |

FIG. 11C

| VB | |
|---|---|
| GLOSSY PAPER | ENVELOPE |
| 5 | 5 |

FIG. 11D

| VC | TE<10°C | 10°C≤TE<15°C | 15°C≤TE<20°C | 20°C≤TE<25°C | 25°C≤TE<30°C | 30°C≤TE |
|---|---|---|---|---|---|---|
| 0%≤HU<20% | 5 | 5 | 5 | 5 | 5 | 5 |
| 20%≤HU<30% | 5 | 5 | 5 | 5 | 5 | 5 |
| 30%≤HU<40% | 0 | 0 | 0 | 0 | 0 | 0 |
| 40%≤HU<50% | 0 | 0 | 0 | 0 | 0 | 0 |
| 50%≤HU<60% | 0 | 0 | 0 | 0 | 0 | 0 |
| 60%≤HU | −5 | −5 | −5 | −5 | −5 | −5 |

FIG. 11E

| VD | | | |
|---|---|---|---|
| Y | M | C | K |
| 0 | 0 | 5 | 5 |

IMAGE FORMING APPARATUS AND CONTROL METHOD OF IMAGE FORMING APPARATUS

REFERENCE TO RELATED APPLICATIONS

This application claims priority from Japanese Patent Application No. 2022-104912 filed on Jun. 29, 2022. The entire content of the priority application is incorporated herein by reference.

BACKGROUND ART

An image forming apparatus includes a photosensitive member and a transfer member. A toner image formed on the photosensitive member is transferred to a sheet that passes through a transfer position between the photosensitive member and the transfer member.

DESCRIPTION

In an image forming apparatus, while a leading end portion of a transfer sheet is being conveyed through a transfer position between a photosensitive member and a transfer member, an output applying section gradually increases a transfer output to a predetermined steady-state transfer output value. Further, while a trailing end portion of the transfer sheet is being conveyed through the transfer position, the output applying section gradually decreases the transfer output to an output value used when transfer is not performed.

In the above image forming apparatus, the output applying section changes the transfer output while the leading end portion or the trailing end portion of the transfer sheet is being conveyed through the transfer position. Thus, the distance between the transfer sheets becomes long, and there is a limit to improvement in printing throughput.

When the distance between the transfer sheets is shortened, banding tends to occur in the toner image formed on the leading end portion of the subsequent transfer sheet. If the transfer output is reduced at the trailing end portion of the preceding transfer sheet in order to prevent banding from occurring in the toner image formed on the leading end portion of the subsequent transfer sheet, blurring tends to occur in the toner image formed on the preceding transfer sheet. In view of the foregoing, an example of an object of this disclosure is to reduce disturbance of a toner image that is transferred to a sheet.

According to one aspect, this specification discloses an image forming apparatus. The image forming apparatus includes a photosensitive drum, a transfer member, a humidity sensor, a sheet sensor, and a controller. The transfer member includes at least a transfer roller or a transfer belt. A transfer nip is formed between the transfer member and the photosensitive drum. The transfer member transfers a toner image formed on the photosensitive drum to a sheet that passes through the transfer nip. The humidity sensor detects humidity. Thus, the controller performs control based on the humidity. The sheet sensor is arranged upstream of the transfer member in a sheet conveyance direction. The sheet sensor detects a trailing end of the sheet. Thus, the controller performs control based on a position of the sheet. In response to an elapse of a particular period after the sheet sensor detects the trailing end of the sheet, the controller changes a transfer bias to be applied to the transfer member from a first transfer bias to a second transfer bias. The second transfer bias has a smaller absolute value than the first transfer bias. Thus, the transfer current that flows from the transfer member to the sheet is changed. The controller changes the particular period based on the humidity detected by the humidity sensor. Thus, the transfer current that flows from the transfer member to the sheet is changed as appropriate. Thus, disturbance of a toner image that is transferred to the sheet is reduced. This specification also discloses a control method of an image forming apparatus.

FIG. 10 is a table showing relationships between an environment, a type of sheet, a value of period ΔT, and a likelihood of occurrence of banding and blurring.

FIG. 11A is a table showing sheet conveyance speeds and values VA stored in a ROM.

FIG. 11B is a table showing types of sheets and values VB stored in the ROM.

FIG. 11C is a table showing types of sheets and the values VB stored in the ROM.

FIG. 11D is a table showing temperatures, humidities, and values VC stored in the ROM.

FIG. 11E is a table showing print positions and values VD stored in the ROM.

CONFIGURATION OF IMAGE FORMING APPARATUS 1

Figure 1:
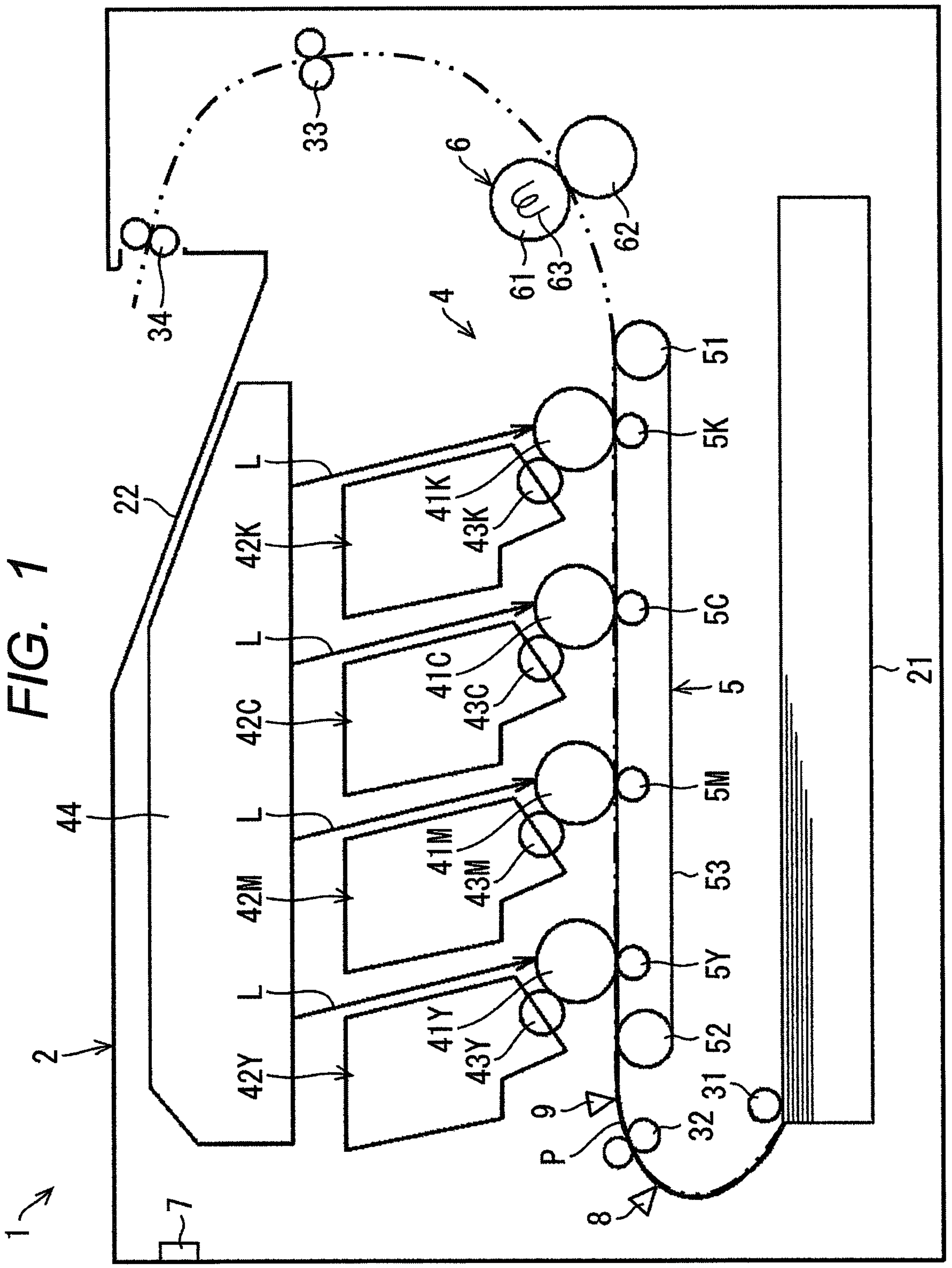
FIG. 1 is a cross-sectional view showing an internal configuration of an image forming apparatus.

As shown in FIG. 1, an image forming apparatus 1 is, for example, a laser printer, and is configured to form an image on a sheet P such as plain paper, thin paper, thick paper, coated paper, resin sheet, cloth, postcard, and envelope, for example. In FIG. 1, the image forming apparatus 1 is a color printer.

As shown in FIG. 1, the image forming apparatus 1 includes a housing 2, a feed tray 21, a discharge tray 22, a feed roller 31, a registration roller 32, a conveyance roller 33, and a discharge roller 34. The image forming apparatus

1 also includes a print engine 4, a transfer unit 5, a fuser 6, a temperature-humidity sensor 7, a first sheet sensor 8, and a second sheet sensor 9.

The feed tray 21 is movably arranged in a lower part of the inside of the housing 2 and is configured to accommodate a plurality of sheets P. The discharge tray 22 is provided in an upper part of the housing 2 and supports the sheet P on which an image is formed. Although one feed tray 21 is shown in FIG. 1, the number of feed trays may be two or more.

The feed roller 31 feeds the sheets P accommodated in the feed tray 21 one by one to the registration roller 32. The registration roller 32 aligns the direction of the leading end of the sheet P, and then conveys the sheet P to a photosensitive drum 41Y The conveyance roller 33 is arranged downstream of the fuser 6 in a sheet conveyance direction, and conveys the sheet P to the discharge roller 34. The sheet conveyance direction is the direction in which the sheet P is conveyed by a conveyor 3 described later. The discharge roller 34 discharges the sheet P onto the discharge tray 22.

<Configuration of Print Engine 4>

The print engine 4 has four photosensitive drums 41Y, 41M, 41C and 41K, four development devices 42Y, 42M, 42C and 42K, and an exposure device 44. The photosensitive drums 41Y, 41M, 41C, and 41K correspond to each color of yellow (Y), magenta (M), cyan (C), and black (K), and are arranged to be spaced from each other in order from the upstream side in the sheet conveyance direction. That is, a plurality of photosensitive drums are arranged along the sheet conveyance direction. The photosensitive drums 41Y, 41M, 41C, and 41K are rotationally driven by a drive motor (not shown) and uniformly charged by a charger (not shown).

The development devices 42Y, 42M, 42C and 42K are arranged above the photosensitive drums 41Y, 41M, 41C and 41K, respectively. The development devices 42Y, 42M, 42C, and 42K contain toners corresponding to respective colors. Development rollers 43Y, 43M, 43C and 43K are arranged at the lower ends of the development devices 42Y, 42M, 42C and 42K, respectively.

The exposure device 44 is arranged above the development devices 42Y, 42M, 42C and 42K. The exposure device 44 performs exposure by irradiating the photosensitive drums 41Y, 41M, 41C, and 41K with laser light L based on image data. Thus, electrostatic latent images based on the image data to be formed on the sheet P are formed on the surfaces of the photosensitive drums 41Y, 41M, 41C, and 41K.

The development rollers 43Y, 43M, 43C and 43K supply toner to the photosensitive drums 41Y, 41M, 41C and 41K. As a result, the electrostatic latent images formed on the surfaces of the photosensitive drums 41Y, 41M, 41C, and 41K become toner images.

<Configuration of Transfer Unit 5>

The transfer unit 5 is arranged along the lower sides of the photosensitive drums 41Y, 41M, 41C, and 41K. The transfer unit 5 forms transfer nips with the photosensitive drums 41Y, 41M, 41C, and 41K. The transfer unit 5 transfers the toner images formed on the photosensitive drums 41Y, 41M, 41C, and 41K onto the sheet P passing through the transfer nips. The transfer unit 5 includes a drive roller 51, a follow roller 52, an endless belt 53, and four transfer rollers 5Y, 5M, 5C and 5K. The transfer unit 5 is an example of a transfer member.

The endless belt 53 is a component that transfers the toner on the surfaces of the photosensitive drums 41Y, 41M, 41C, and 41K onto the sheet P. The endless belt 53 is an annular belt configured to contact the photosensitive drums 41Y, 41M, 41C, and 41K. The outer peripheral surfaces of the photosensitive drums 41Y, 41M, 41C, and 41K are configured to contact the outer peripheral surface of the endless belt 53. During image formation, the sheet P is conveyed between the endless belt 53 and the photosensitive drums 41Y, 41M, 41C and 41K.

The endless belt 53 is stretched between the drive roller 51 and the follow roller 52. The drive roller 51 drives the endless belt 53. The follow roller 52 rotates by following movement of the endless belt 53 due to driving of the drive roller 51.

The transfer rollers 5Y, 5M, 5C, and 5K are spaced apart from each other and provided on the inner peripheral side of the endless belt 53. The transfer roller 5K that transfers a black toner image onto a sheet is arranged on the most downstream side in the sheet conveyance direction among the plurality of transfer rollers 5Y, 5M, 5C, and 5K.

The transfer rollers 5Y, 5M, 5C, and 5K are located below the corresponding photosensitive drums 41Y, 41M, 41C, and 41K, and the endless belt 53 is sandwiched between the transfer rollers 5Y, 5M, 5C, and 5K and the photosensitive drums 41Y, 41M, 41C, and 41K. In other words, the plurality of transfer rollers are arranged so as to face the plurality of photosensitive drums. The transfer rollers 5Y, 5M, 5C and 5K press the endless belt 53 toward the photosensitive drums 41Y, 41M, 41C and 41K. The transfer rollers 5Y, 5M, 5C and 5K are ion conductive transfer rollers, for example.

<Configuration of Fuser 6>

The fuser 6 is arranged downstream of the transfer unit 5 in the sheet conveyance direction, and includes a heating roller 61 including a heater 63 and a pressure roller 62. The heater 63 is, for example, a halogen heater. The heater 63 heats the sheet P via the heating roller 61. The fuser 6 fixes the toner image transferred on the sheet P by the transfer unit 5 to the sheet P by heating the sheet P with the heater 63.

<Configuration of Temperature-Humidity Sensor 7>

The temperature-humidity sensor 7 is a sensor that detects the temperature and humidity of the air inside the housing 2. The temperature-humidity sensor 7 is provided inside the housing 2. The image forming apparatus 1 may include a humidity sensor that detects the humidity of the air inside the housing 2 instead of the temperature-humidity sensor 7, or may include a temperature sensor and a humidity sensor. The temperature sensor is a sensor that detects the temperature of the air inside the housing 2. The temperature-humidity sensor 7 is an example of a humidity sensor.

<Configuration of First Sheet Sensor 8 and Second Sheet Sensor 9>

The first sheet sensor 8 and the second sheet sensor 9 are arranged upstream of the transfer unit 5 in the sheet conveyance direction. The first sheet sensor 8 and the second sheet sensor 9 detect the presence of the sheet P and detect the trailing end of the sheet P. The first sheet sensor 8 and the second sheet sensor 9 are examples of a sheet sensor. The first sheet sensor 8 is arranged upstream of the registration roller 32 in the sheet conveyance direction. The second sheet sensor 9 is arranged downstream of the registration roller 32 in the sheet conveyance direction.

<Electrical Configuration of Image Forming Apparatus 1>

Figure 2:
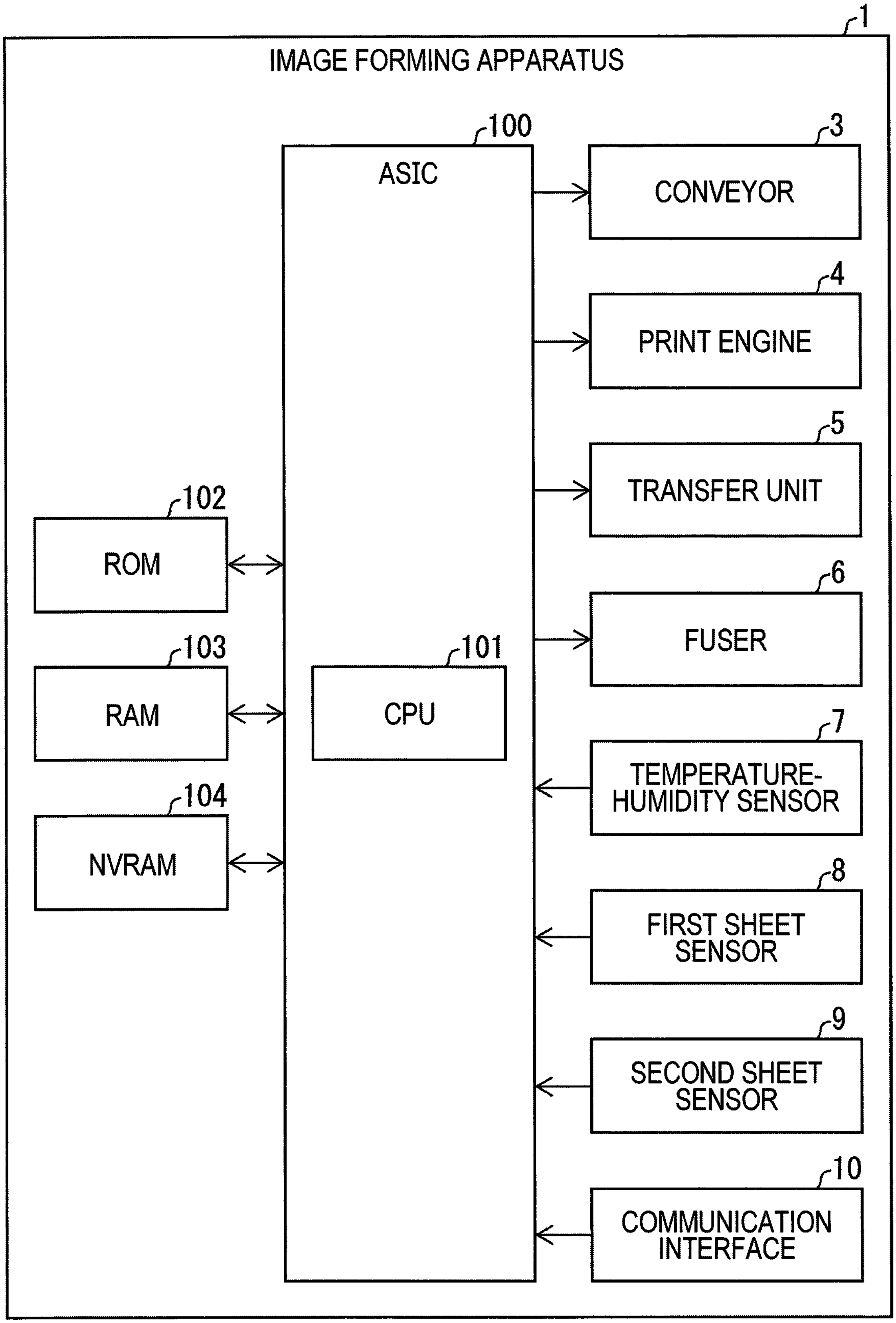
FIG. 2 is a block diagram showing an electrical configuration of the image forming apparatus shown in FIG. 1.

As shown in FIG. 2, the image forming apparatus 1 includes the conveyor 3 and a communication interface 10. The image forming apparatus 1 also includes an ASIC (Application Specific Integrated Circuit) 100, a ROM (Read Only Memory) 102, a RAM (Random Access Memory) 103, and an NVRAM (Non-Volatile Random Access Memory) 104.

The ASIC 100 includes a CPU (Central Processing Unit) 101. The CPU 101 is an example of a controller, and executes overall controls over each unit of the image forming apparatus 1. The ASIC 100 is electrically connected to the conveyor 3, the print engine 4, the transfer unit 5, the fuser 6, the temperature-humidity sensor 7, the first sheet sensor 8, the second sheet sensor 9, and the communication interface 10. The ASIC 100 is also electrically connected to the ROM 102, the RAM 103 and the NVRAM 104.

The ROM 102 is an example of a memory, and stores various control programs, various settings, and so on, for controlling the image forming apparatus 1. The RAM 103 is used as a work area from which various control programs are read, and is also used as a storage area for temporarily storing image data, raster data, and so on. The NVRAM 104 preliminarily stores various data relating to image formation. The CPU 101 controls the conveyor 3, the print engine 4, the transfer unit 5, and the fuser 6 based on the control program read from the ROM 102.

The conveyor 3 includes the feed roller 31, the registration roller 32, the conveyance roller 33, and the discharge roller 34. The conveyor 3 drives the feed roller 31, the registration roller 32, the conveyance roller 33, and the discharge roller 34 by a driving motor (not shown). The CPU 101 controls the conveyor 3 to convey the sheet P such that a sheet interval, which is the distance between a trailing end of a preceding sheet P and a leading end of a subsequent sheet P, is shorter than the length of one circumference of each of the photosensitive drums 41Y, 41M, 41C, and 41K.

The communication interface 10 is connected for communication with an external terminal to communicate with the external terminal. The communication interface 10 receives a print job from the external terminal. The print job includes information necessary for printing an image on the sheet P, such as image data for printing, the size and type of the sheet P used for printing, or the number of copies to be printed.

<Mechanism of Occurrence of Banding in Toner Image>

Figure 3A:
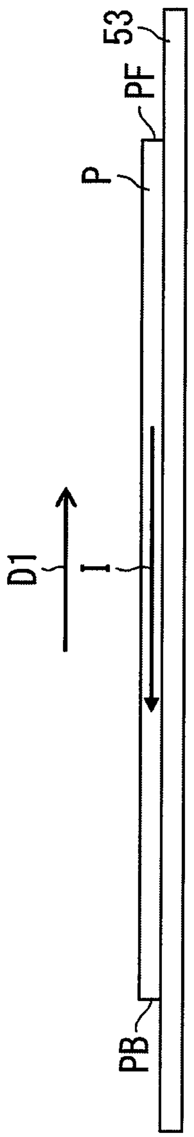
FIG. 3A is a schematic diagram showing a state where a transfer current flows through a sheet conveyed on an endless belt.
Figure 3B:
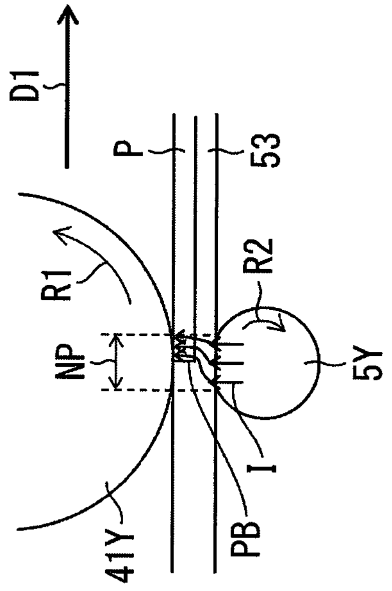
FIG. 3B is a schematic diagram showing a state where the transfer current flowing through the sheet conveyed on the endless belt also flows into a photosensitive drum.
Figure 3C:
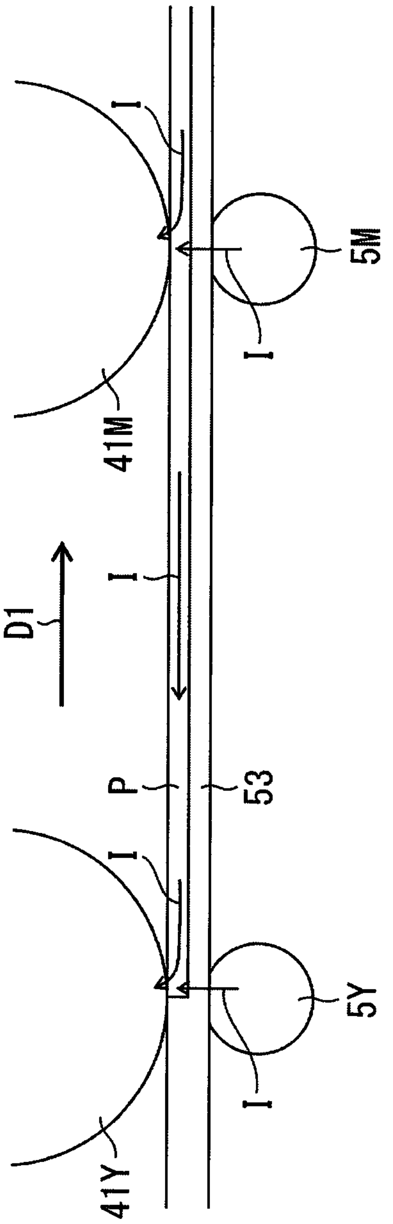
FIG. 3C is a schematic diagram showing a state where the transfer current flows from a transfer roller located on a downstream side in a sheet conveyance direction to a surface of a photosensitive drum located on an upstream side.

FIG. 3A shows a state where a transfer current I flows through the sheet P conveyed on the endless belt 53. FIG. 3B shows a state where the transfer current I flows from the transfer roller 5Y to the surface of the photosensitive drum 41Y via the endless belt 53 and the sheet P. FIG. 3C shows a state where the transfer current I flows from the transfer roller 5M located on the downstream side in a sheet conveyance direction D1 to the surface of the photosensitive drum 41Y located on the upstream side. The transfer current I is a current that flows through the sheet P from the transfer rollers 5Y, 5M, 5C, and 5K.

As shown in FIG. 3A, the transfer current I flows through the sheet P in a direction opposite to the sheet conveyance direction D1. The current distribution of the transfer current I flowing through the sheet P is such that the transfer current I is small on a leading end PF side of the sheet P and is large on a trailing end PB side of the sheet P.

As shown in FIG. 3B, a case is considered in which the trailing end PB of the sheet P passes between the photosensitive drum 41Y rotating in a direction R1 and the transfer roller 5Y rotating in a direction R2. In this case, in a region of a transfer nip NP, when the sheet P is conveyed in the sheet conveyance direction D1, a portion where the sheet P exists and a portion where the sheet P does not exist are generated in the transfer nip NP. The transfer nip NP is a region where the photosensitive drum 41Y is in contact with the sheet P and the endless belt 53.

An air layer (not shown) is formed between the photosensitive drum 41Y and the endless belt 53 in a portion where the sheet P does not exist. When an air layer is formed between the photosensitive drum 41Y and the endless belt 53, the air layer acts as resistance and an electrical resistance of a portion where the sheet P does not exist increases. In other words, electric charge is less likely to flow through the portion where the sheet P does not exist.

In contrast, in a portion where the sheet P exists, since the sheet P is sandwiched between the photosensitive drum 41Y and the endless belt 53, an air layer is less likely to be formed. That is, the electrical resistance of the portion where the sheet P exists in the transfer nip NP is lower than the electrical resistance of the portion where the sheet P does not exist. In other words, more electric charge tends to flow through the portion where the sheet P exists.

Thus, the transfer current I flows more easily from the transfer roller 5Y through the portion where the sheet P exists than the portion where the sheet P does not exist in the transfer nip NP, and electric charge concentrates. Further, the lower the electrical resistance of the sheet P, the greater the difference between the electrical resistance of the portion where the sheet P exists and the electrical resistance of the portion where the sheet P does not exist in the transfer nip NP. Thus, the electric charge concentrates more in the portion where the sheet P exists in the transfer nip NP.

The transfer current I flowing from the transfer roller 5Y to the trailing end PB of the sheet P also flows from the trailing end PB of the sheet P to the surface of the photosensitive drum 41Y This increases the transfer current I flowing to the surface of the photosensitive drum 41Y That is, the electric charge concentrates on the surface of the photosensitive drum 41Y, and thus the change in the surface potential of the photosensitive drum 41Y increases.

As the change in the surface potential of the photosensitive drum 41Y increases, a toner image transferred to the sheet P tends to have banding. Banding is disturbance of a toner image due to a large transfer current I flowing through the sheet P and a large change in the surface potential of the photosensitive drum 41Y, and is a phenomenon that part of a toner image formed on a subsequent sheet P becomes darker than the other parts. Banding occurs in areas where an image is formed in the sheet P. The phenomenon described with reference to FIG. 3B occurs both when the image forming apparatus 1 executes monochrome printing and when the image forming apparatus 1 executes color printing, and also occurs when the image forming apparatus 1 is a monochrome printer.

In addition to the phenomenon described in FIG. 3B, banding in a case where four photosensitive drums 41Y, 41M, 41C and 41K and four transfer rollers 5Y, 5M, 5C and 5K are provided will be described with referring to FIG. 3C. For convenience of explanation, only the photosensitive drums 41Y, 41M and the transfer rollers 5Y, 5M among the four photosensitive drums 41Y, 41M, 41C, 41K and the four transfer rollers 5Y, 5M, 5C, 5K are illustrated and explained in FIG. 3C.

As shown in FIG. 3C, the transfer current I flows from the transfer roller 5M located on the downstream side in the sheet conveyance direction D1 via the sheet P to the surface of the photosensitive drum 41Y located on the upstream side. Similarly, the transfer current I flows from the transfer roller 5C via the sheet P to the surfaces of the photosensitive drums 41Y and 41M, and the transfer current I flows from the transfer roller 5K via the sheet P to the surfaces of the photosensitive drums 41Y, 41M and 41C.

For this reason, a larger transfer current I flows to the surface of the photosensitive drum located on the upstream side than to the surface of the photosensitive drum located on the downstream side in the sheet conveyance direction D1. Thus, a toner image transferred to the sheet P at the transfer nip located upstream is more susceptible to banding than a toner image transferred to the sheet P at the transfer nip located downstream in the sheet conveyance direction D1. Further, the lower the electrical resistance of the sheet P, the easier the transfer current I flows through the sheet P, and banding more easily occurs in the toner image. The phenomenon described with reference to FIG. 3C occurs when the image forming apparatus 1 performs color printing.

The image forming apparatus 1 of the present disclosure reduces disturbance of the toner image transferred to the sheet P. In the image forming apparatus 1, banding and blurring are reduced as an example of disturbance of toner images. Blurring means that a sufficient toner image is not formed on the sheet P due to insufficient transfer current flowing through the sheet P, and that part of the toner image formed on the sheet P becomes lighter than the other parts.

If the source of the transfer current I is an ideal constant current source, the transfer current I is always kept constant. However, in reality, the supply source of the transfer current I is not an ideal constant current source. Thus, when the leading end PF of the sheet P enters the transfer nip, when the trailing end PB of the sheet P separates from the transfer nip, and so on, the electrical resistance of the transfer nip suddenly changes and the transfer current I fluctuates temporarily.

The fluctuation range of the transfer current I is suppressed as the transfer current I becomes smaller. Thus, it is considered that the transfer current I when the leading end PF or the trailing end PB of the sheet P passes through the transfer nip is set to be smaller than the transfer current I when a toner image is being transferred to the sheet P. Details will be described later.

<Transfer Current Application Timing>

Figure 4:
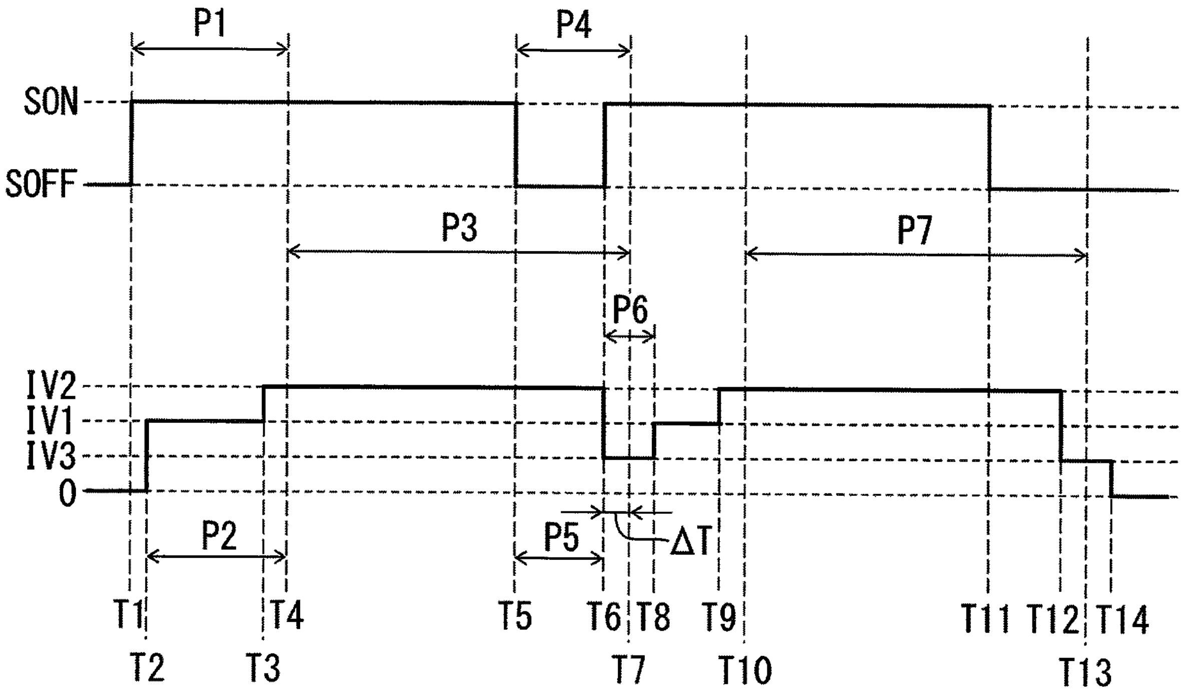
FIG. 4 is a timing chart showing application timing of a transfer current to a transfer unit included in the image forming apparatus shown in FIG. 1.

FIG. 4 shows application timing of a transfer current to the transfer unit 5 included in the image forming apparatus 1 shown in FIG. 1. The transfer current applied to the transfer unit 5 by control of the CPU 101 is an example of a transfer bias. FIG. 4 shows the application timing of the transfer current to one transfer roller 5Y among the plurality of transfer rollers 5Y, 5M, 5C, and 5K.

In FIG. 4, "SON" indicates that the second sheet sensor 9 is on when the second sheet sensor 9 detects the presence of the sheet P, and "SOFF" indicates that the second sheet sensor 9 is off when the second sheet sensor 9 does not detect the existence of the sheet P.

Alternatively, "SON" may indicate that the first sheet sensor 8 is on when the first sheet sensor 8 detects the presence of the sheet P, and "SOFF" may indicate that the first sheet sensor 8 is off when the first sheet sensor 8 does not detect the presence of the sheet P. The timings T1 to T14 are chronologically arranged in the order of the timings T1 to T14.

The CPU 101 applies transfer currents at application timings shown in FIG. 4 to each of the plurality of transfer rollers 5Y, 5M, 5C, and 5K. FIG. 4 illustrates a case where the CPU 101 applies a transfer current to the transfer roller 5Y. IV1 to IV3 are current values of the transfer current applied to the transfer roller 5Y The current value IV1 has a larger absolute value than the current value IV3, and the current value IV2 has a larger absolute value than the current value IV1.

As shown in FIG. 4, the second sheet sensor 9 is turned on at timing T1. Timing T1 is the timing at which the second sheet sensor 9 detects the leading end PF of the sheet P. At timing T1, the CPU 101 receives, from the second sheet sensor 9, an ON signal indicating that the second sheet sensor 9 is ON. At timing T2, the CPU 101 starts applying a transfer current to the transfer roller 5Y at the current value IV1. At timing T3, the CPU 101 changes the transfer current applied to the transfer roller 5Y from a transfer current of the current value IV1 to a transfer current of the current value IV2.

At timing T4, the leading end PF of the sheet P reaches the transfer nip formed between the photosensitive drum 41Y and the transfer roller 5Y. At timing T5, the second sheet sensor 9 changes from ON to OFF. Timing T5 is the timing at which the second sheet sensor 9 detects the trailing end PB of the sheet P. At timing T5, the ON signal from the second sheet sensor 9 to the CPU 101 stops.

At timing T6, the CPU 101 changes the transfer current applied to the transfer roller 5Y from a transfer current of the current value IV2 to a transfer current of the current value IV3. The transfer current of the current value IV2 is an example of a first transfer bias, and the transfer current of the current value IV3 is an example of a second transfer bias.

The process executed by the CPU 101 at timing T6 is an example of a bias change process. At timing T6, the trailing end PB of the sheet P reaches near the transfer nip formed between the photosensitive drum 41Y and the transfer roller 5Y. At timing T6, the CPU 101 changes the transfer current applied to each of the plurality of transfer rollers 5Y, 5M, 5C, and 5K from the transfer current of the current value IV2 to the transfer current of the current value IV3. At timing near timing T6, the second sheet sensor 9 is turned on, and the second sheet sensor 9 detects the leading end PF of the subsequent sheet P. At timing near timing T6, the CPU 101 receives an ON signal from the second sheet sensor 9.

At timing T7, the trailing end PB of the sheet P exits the transfer nip formed between the photosensitive drum 41Y and the transfer roller 5Y. At timing T8, the CPU 101 changes the transfer current applied to the transfer roller 5Y from a transfer current of the current value IV3 to a transfer current of the current value IV1. At timing T9, the CPU 101 changes the transfer current applied to the transfer roller 5Y from a transfer current of the current value IV1 to a transfer current of the current value IV2.

At timing T10, the leading end PF of the subsequent sheet P reaches the transfer nip formed between the photosensitive drum 41Y and the transfer roller 5Y. At timing T11, the second sheet sensor 9 changes from ON to OFF. Timing T11 is the timing at which the second sheet sensor 9 detects the trailing end PB of the subsequent sheet P. The ON signal from the second sheet sensor 9 to the CPU 101 stops at timing T11.

At timing T12, the CPU 101 changes the transfer current applied to the transfer roller 5Y from a transfer current of the current value IV2 to a transfer current of the current value IV3. At timing T13, the trailing end PB of the subsequent sheet P exits the transfer nip formed between the photosensitive drum 41Y and the transfer roller 5Y. At timing T14, the CPU 101 stops applying the transfer current to the transfer roller 5Y <Periods Between Timings>

A period P1 is a period of time from timing T1 to timing T4 and is preliminarily stored in the ROM 102. The period P1 is preliminarily set to be the sum of the time required for the photosensitive drum 41Y to rotate once and a particular short time. The CPU 101 determines the timing T4 based on the timing T1 by referring to the period P1 in the ROM 102.

A period P2 is a period of time from timing T2 to timing T4 and is preliminarily stored in the ROM 102. The CPU 101 determines the timing T2 based on the determined timing T4 by referring to the period P2 in the ROM 102. Further, the CPU 101 determines the timing T3 to be a timing within a particular period including the determined timing T4. A period P3 is a period of time from timing T4 to timing T7, and is a period of time during which the sheet P passes between the photosensitive drum 41Y and the transfer roller 5Y.

A period P4 is a period of time from timing T5 to timing T7 and is preliminarily stored in the ROM 102. The period P4 is preliminarily set to be a period of time from when the second sheet sensor 9 is turned off to when the trailing end PB of the sheet P exits the transfer nip formed between the photosensitive drum 41Y and the transfer roller 5Y The CPU 101 determines the timing T7 based on the timing T5 by referring to the period P4 in the ROM 102.

A period P5 is a period of time from timing T5 to timing T6, and is an example of a particular period. In S2 shown in FIG. 7, the CPU 101 determines the timing T6 based on the timing T7. As shown in FIG. 4, the timing T6 is the timing after the period P5 has elapsed from the timing T5. Here, the period P5 is defined by Equation 1, and a period ΔT is defined by Equation 2.

$$P5=P4+\Delta T \quad \text{(Equation 1)}$$

$$\Delta T=VA+VB+VC+VD \quad \text{(Equation 2)}$$

The period P4 is the length of time from the timing T5 to the timing T7, that is, the length of time from when the second sheet sensor 9 is turned off to when the trailing end PB of the sheet P exits the transfer nip formed between the photosensitive drum 41Y and the transfer roller 5Y.

The period P5 is the length of time from timing T5 to timing T6, that is, the length of time from when the second sheet sensor 9 is turned off to when the transfer bias applied to the transfer unit 5 is changed from a first transfer bias to a second transfer bias having a smaller absolute value than the first transfer bias.

Timing T6 is a timing shifted by the period ΔT from timing T7. The period ΔT is adjusted to a value that suppresses occurrence of banding and blurring. The period ΔT, a value VA, a value VB, a value VC, and a value VD will be described later.

A period P6 is a period of time from timing T6 to timing T8 and is preliminarily stored in the ROM 102. The CPU 101 determines the timing T8 based on the timing T6 by referring to the period P6 in the ROM 102. A period P7 is a period of time from timing T10 to timing T13. The period P7 is preliminarily set to be a period of time during which the subsequent sheet P passes between the photosensitive drum 41Y and the transfer roller 5Y.

The CPU 101 determines, by the timing T7, whether to change the transfer current applied to the transfer roller 5Y from the transfer current of the current value IV3 to the transfer current of the current value IV1 at the timing T8. At this time, the CPU 101 determines timings T8, T9, T12 and T14.

As described above, when the period P5 has elapsed since the second sheet sensor 9 detects the trailing end PB of the sheet P at the timing T5, at the timing T6 the CPU 101 changes the transfer bias applied to the transfer unit 5 from the first transfer bias to the second transfer bias having a smaller absolute value than the first transfer bias. Alternatively, the CPU 101 may change the transfer bias applied to the transfer unit 5 from the first transfer bias to the second transfer bias, when the period P5 has elapsed since the first sheet sensor 8 detects the trailing end PB of the sheet P.

However, it is advantageous that the CPU 101 changes the transfer bias based on the detection of the trailing end PB of the sheet P by the second sheet sensor 9 rather than the detection of the trailing end PB of the sheet P by the first sheet sensor 8. This is because the second sheet sensor 9 detects the sheet P whose leading end PF is aligned by the registration roller 32, and thus the detection by the second sheet sensor 9 is more accurate than the detection by the first sheet sensor 8.

<Transfer Current Flowing to Surface of Photosensitive Drum>

Figure 5:
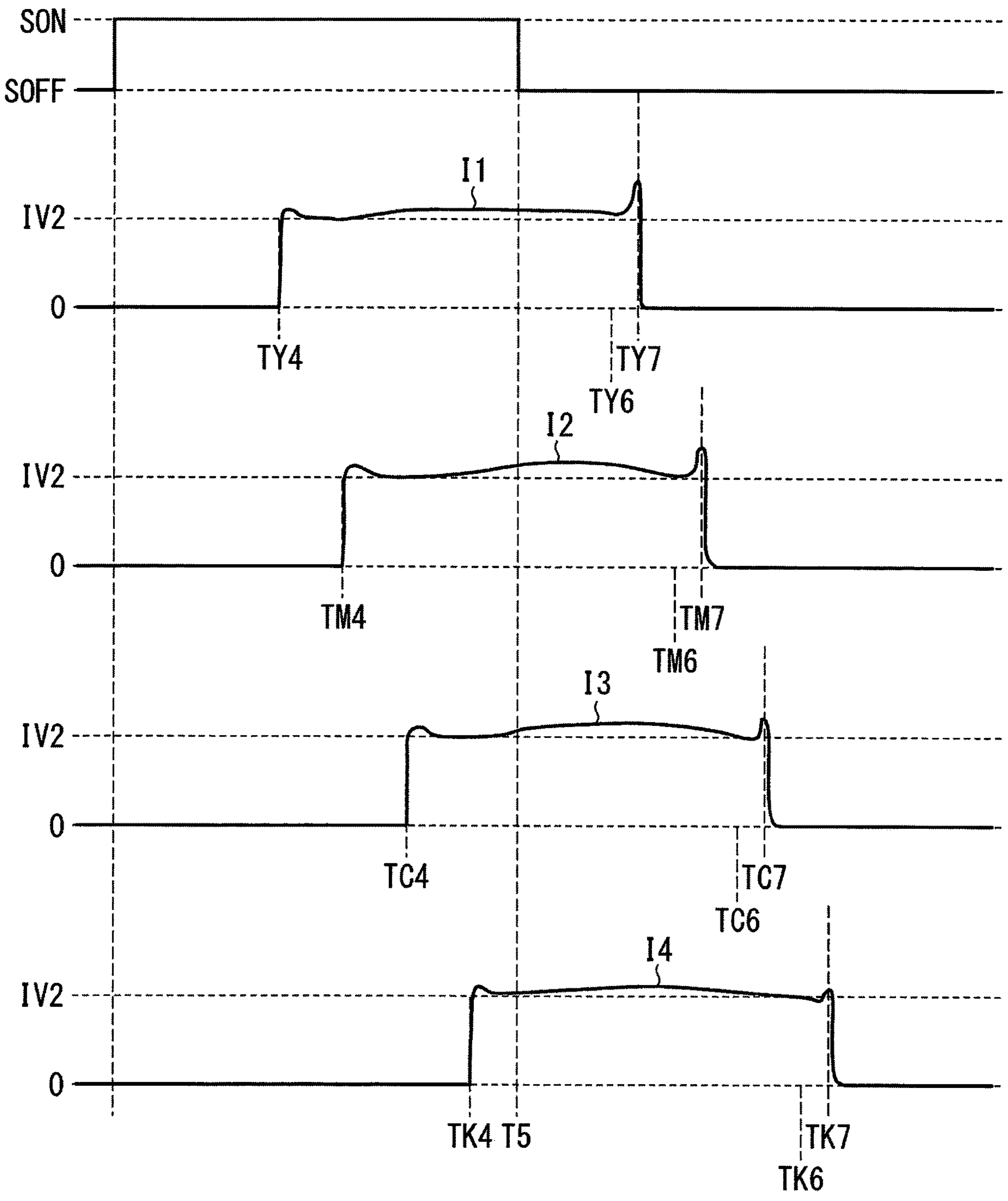
FIG. 5 shows graphs each indicating a transfer current that actually flows from a portion of a transfer nip where a sheet exists to a surface of a photosensitive drum.

FIG. 5 indicates a transfer current that actually flows from a portion of a transfer nip where a sheet exists to a surface of a photosensitive drum. In FIG. 5, a period from timing TY4 to TY7 corresponds to the period P3 shown in FIG. 4. Timing TY6 corresponds to timing T6. That is, at timing TY6, the CPU 101 reduces the transfer current applied to the transfer roller 5Y from the transfer current of the current value IV2 to the transfer current of the current value IV3.

Similarly, timings TM4 to TM7, TC4 to TC7, and TK4 to TK7 correspond to the period P3, and timings TM6, TC6, and TK6 correspond to timing T6. For example, at timing TM6, the CPU 101 reduces the transfer current applied to the transfer roller 5M from the transfer current of the current value IV2 to the transfer current of the current value IV3. In FIG. 5, it is assumed that no subsequent sheet P is conveyed.

As shown in FIG. 5, when the leading end PF of the sheet P reaches the transfer nip NP formed between the photosensitive drum 41Y and the transfer roller 5Y at timing TY4, a transfer current I1 begins to flow from the sheet P to the surface of the photosensitive drum 41Y within the transfer nip NP. When the trailing end PB of the sheet P exits the transfer nip NP at timing TY7, the transfer current I1 flowing from the sheet P to the surface of the photosensitive drum 41Y within the transfer nip NP increases. The transfer current I1 is a current that flows from the sheet P to the surface of the photosensitive drum 41Y within the transfer nip NP.

At timing TY6, the CPU 101 reduces the transfer current applied to the transfer roller 5Y from the transfer current of the current value IV2 to the transfer current of the current value IV3. In spite of this, the magnitude of the transfer current I1 does not decrease at the timing TY6 and increases at the timing TY7. The reason will be described below.

As shown in FIG. 3B, although a portion where the sheet P exists in the transfer nip NP is reduced, the magnitude of the transfer current flowing from the transfer roller 5Y to the sheet P does not change. Thus, the electric charge concentrates on the photosensitive drum 41Y at the portion where the sheet P exists within the transfer nip NP, more specifically, at the moment when the trailing end PB of the sheet P exits the transfer nip NP. As a result, the magnitude of the transfer current I1 flowing from the portion where the sheet P exists to the photosensitive drum 41Y increases.

When the leading end PF of the sheet P reaches the transfer nip formed between the photosensitive drum 41M and the transfer roller 5M at timing TM4, a transfer current I2 begins to flow from the sheet P to the surface of the photosensitive drum 41M within the transfer nip. When the trailing end PB of the sheet P exits the transfer nip at timing TM7, the transfer current I2 flowing from the sheet P to the surface of the photosensitive drum 41M within the transfer nip increases. The transfer current I2 is a current that flows from the sheet P to the surface of the photosensitive drum 41M within the transfer nip.

Similarly, a transfer current I3 begins to flow to the surface of the photosensitive drum 41C at timing TC4, and the transfer current I3 flowing to the surface of the photosensitive drum 41C increases at timing TC7. A transfer current I4 begins to flow to the surface of the photosensitive drum 41K at timing TK4, and the transfer current I4 flowing to the surface of the photosensitive drum 41K increases at timing TK7. The transfer currents I3 and I4 are currents that flow from the sheet P to the surfaces of the photosensitive drums 41C and 41K within the transfer nip, respectively.

Due to the phenomenon described with respect to FIG. 3C, as shown in FIG. 5, the magnitude of the transfer current I1 at the timing TY7 is greater than the magnitude of the transfer current I2 at the timing TM7. The magnitude of the transfer current I2 at the timing TM7 is greater than the magnitude of the transfer current I3 at the timing TC7. The magnitude of the transfer current I3 at the timing TC7 is greater than the magnitude of the transfer current I4 at the timing TK7.

<Occurrence Rate of Banding and Blurring>

Figure 6A:
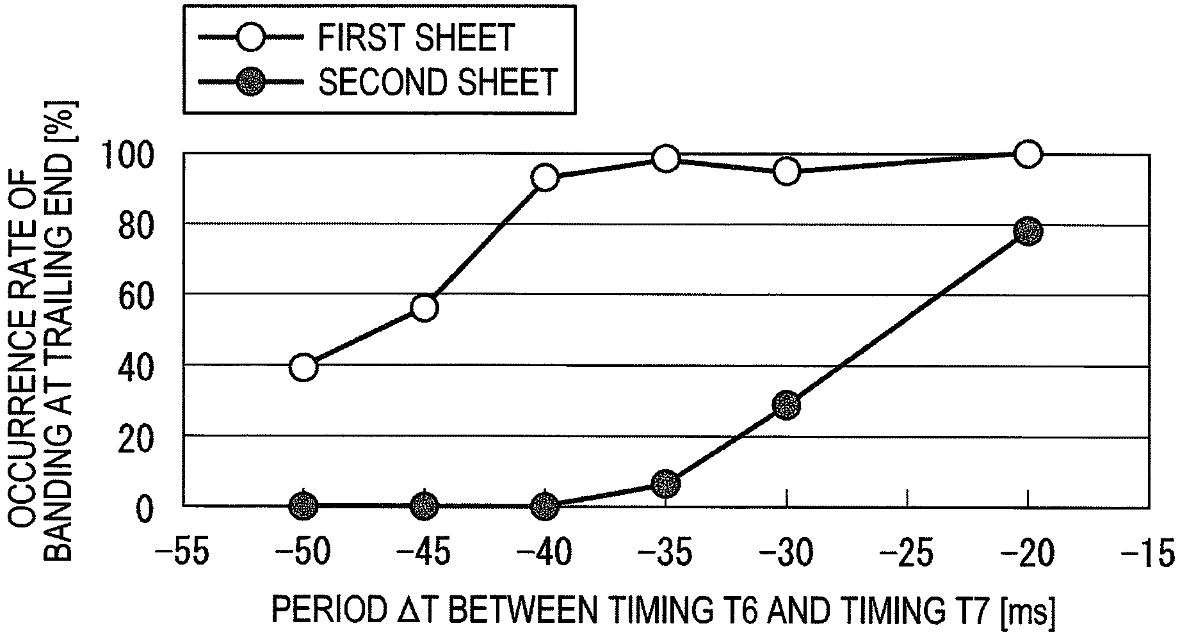
FIG. 6A is a graph showing an occurrence rate of banding at trailing ends of a first sheet and a second sheet.
Figure 6B:
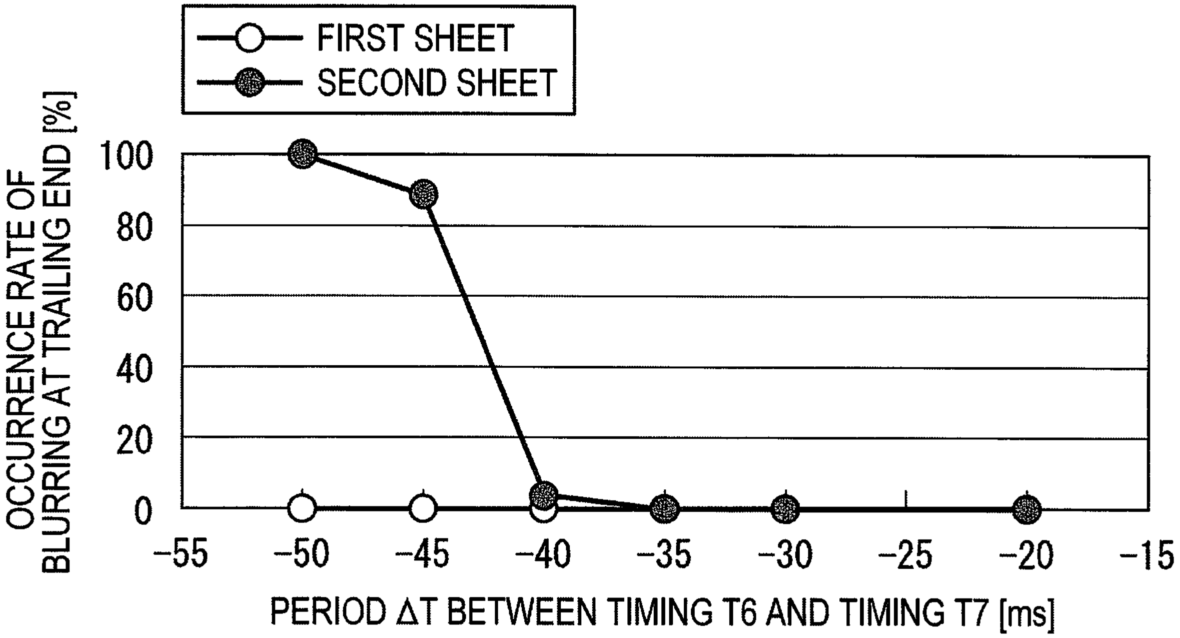
FIG. 6B is a graph showing an occurrence rate of blurring at the trailing ends of the first sheet and the second sheet.

FIG. 6A is a graph showing an occurrence rate of banding at trailing ends of a first sheet and a second sheet, and FIG. 6B is a graph showing an occurrence rate of blurring at the trailing ends of the first sheet and the second sheet. The first sheet and the second sheet are sheets P of different types. The volume resistivity of the first sheet is higher than the volume resistivity of the second sheet, and the surface resistivity (sheet resistivity) of the first sheet is lower than the surface resistivity of the second sheet.

The horizontal axes of FIGS. 6A and 6B indicate the period ΔT [ms] between timing T6 and timing T7. The vertical axis in FIG. 6A indicates the occurrence rate [%] of banding at the trailing ends of the first sheet and the second sheet. The vertical axis in FIG. 6B indicates the occurrence rate [%] of blurring at the trailing ends of the first sheet and the second sheet.

As shown in FIG. 6A, the occurrence rate of banding at the trailing end of the first sheet and the occurrence rate of banding at the trailing end of the second sheet differ depending on the period ΔT. As shown in FIG. 6B, the occurrence rate of blurring at the trailing end of the first sheet and the occurrence rate of blurring at the trailing end of the second sheet differ depending on the period ΔT. Thus, it is advantageous to change the timing T6 depending on the type of sheet P. Details will be described later.

<Likelihood of Occurrence of Banding and Blurring>

Table shown in FIG. 10 indicates the relationship between an environment, a type of sheet, a value of the period ΔT, and a likelihood of occurrence of banding and blurring. The first to third sheets shown in FIG. 10 are sheets P of different types. The "banding" shown in FIG. 10 indicates the likelihood of occurrence of banding, and the likelihood of occurrence of banding is indicated in the order of "D", "C", "B" and "A". That is, "D" indicates that banding is most likely to occur, and "A" indicates that banding is least likely to occur. The "blurring at the trailing end" shown in FIG. 10 indicates the width [mm] of blurring generated in a toner image transferred to the sheet P.

As shown in FIG. 10, in a high-temperature and high-humidity environment, banding is more likely to occur and blurring is less likely to occur than in a normal-temperature, normal-humidity environment. In the normal-temperature and normal-humidity environment, banding is less likely to occur and blurring is more likely to occur than in the high-temperature and high-humidity environment.

<Processing of Image Forming Apparatus 1>

Figure 7:
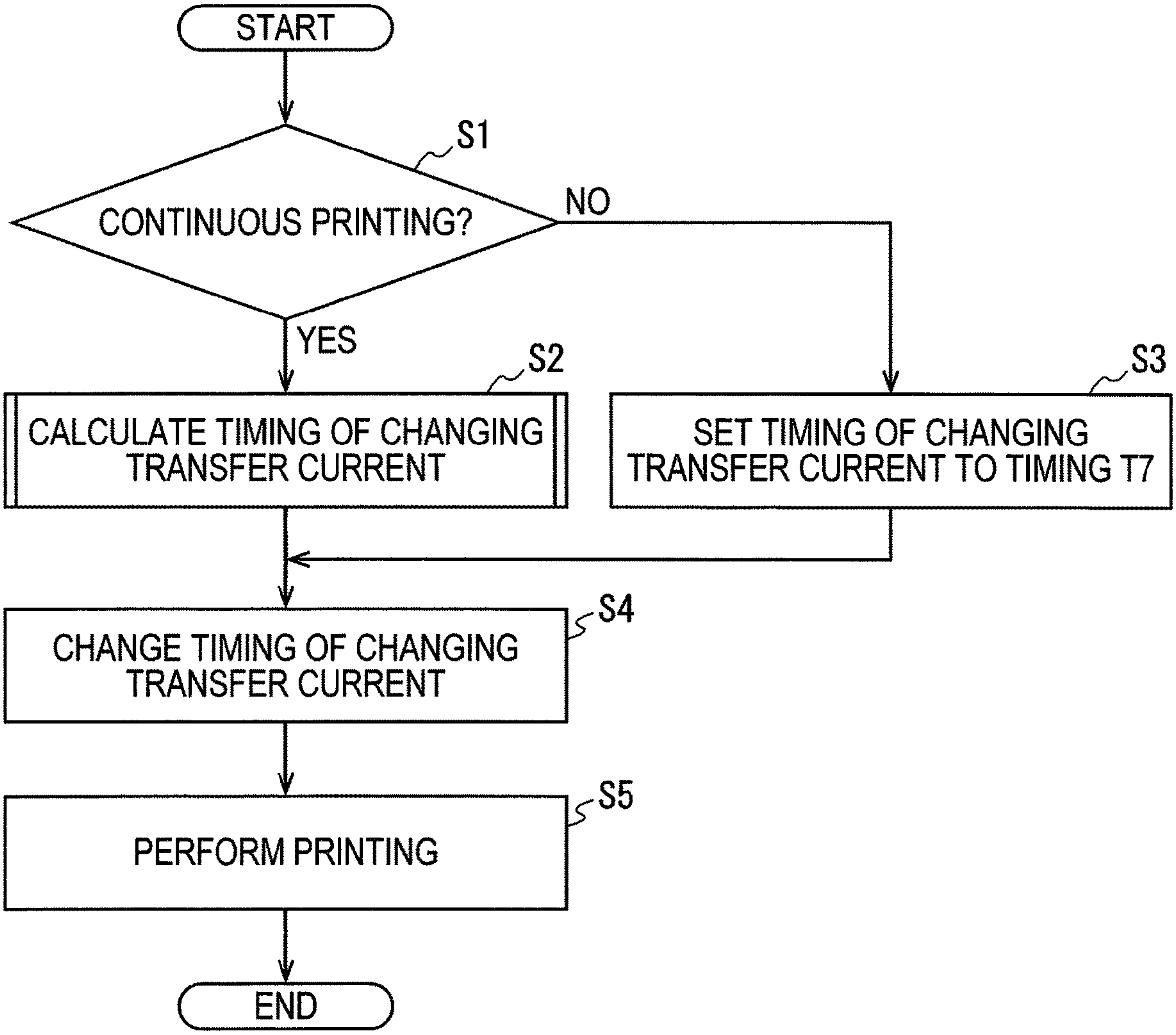
FIG. 7 is a flowchart showing processing of the image forming apparatus shown in FIG. 1.
Figure 8:
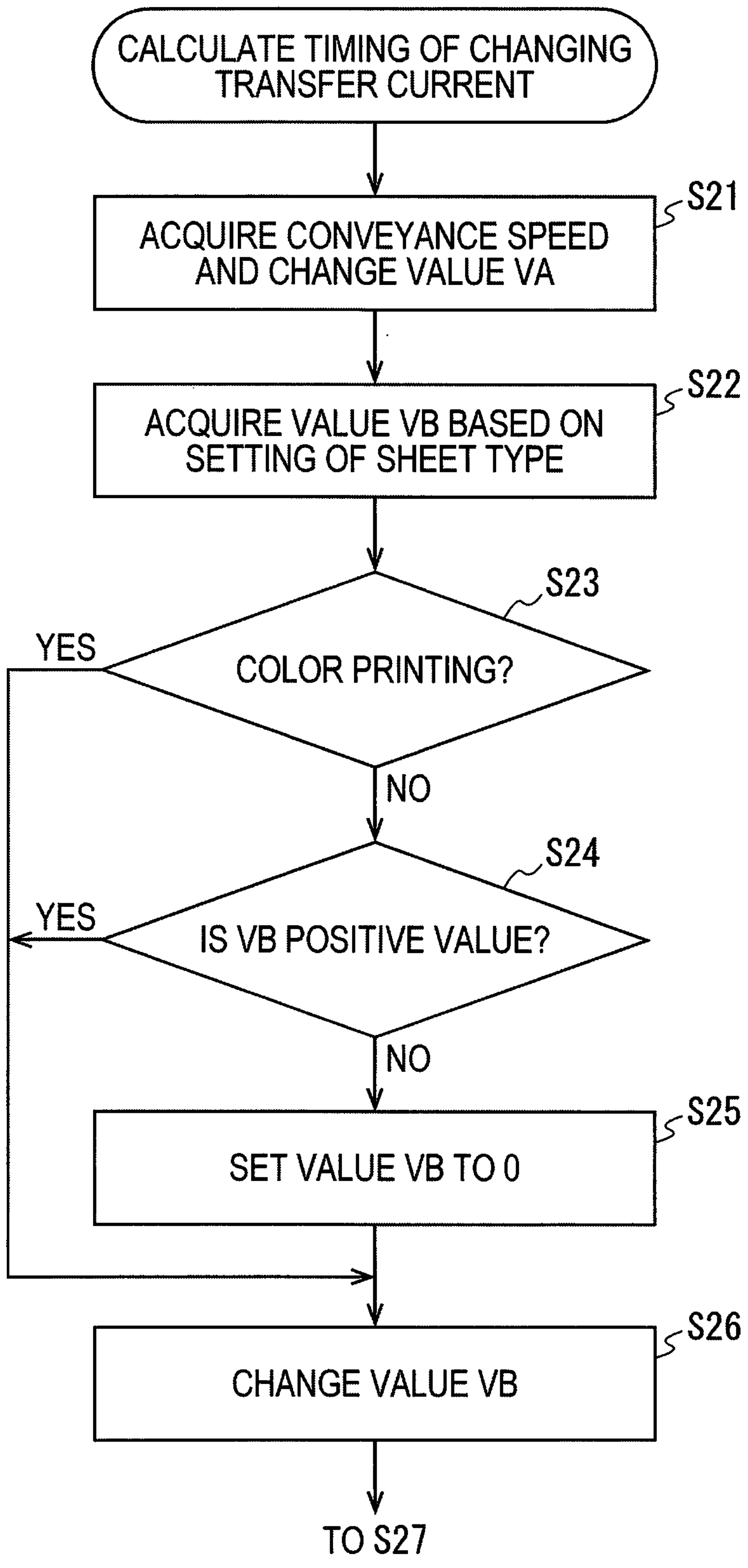
FIG. 8 is a flowchart showing a process of calculating a timing of changing a transfer current among processes shown in FIG. 7.
Figure 9:
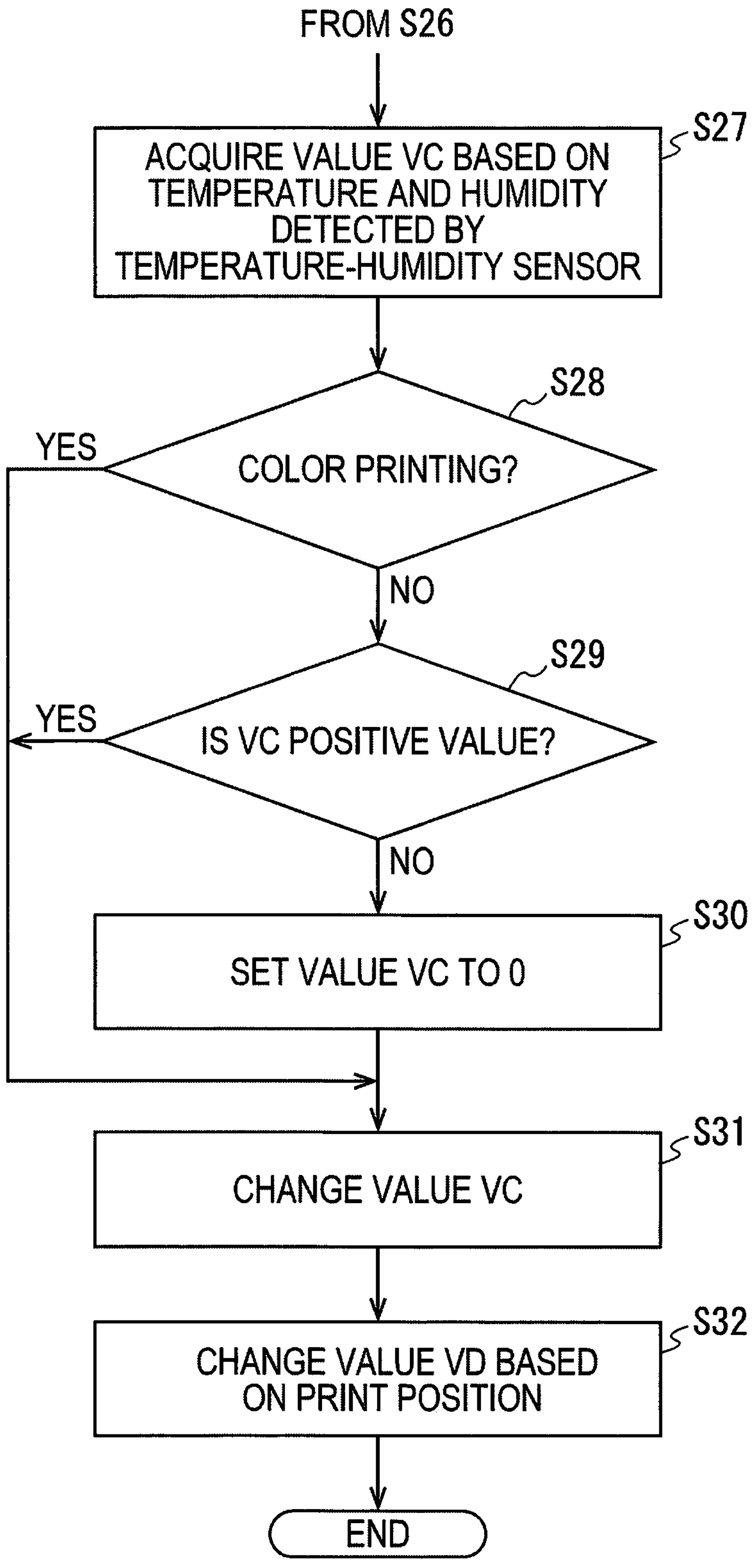
FIG. 9 is a flowchart showing a continuation of processing shown in FIG. 8.

The CPU 101 executes processing shown in FIGS. 7 to 9 for each of the plurality of transfer rollers 5Y, 5M, 5C and 5K.

As shown in FIG. 7, the CPU 101 determines whether a print job includes an instruction for continuous printing (S1). The continuous printing is printing on a plurality of sheets P. In response to determining that the print job does not include an instruction for continuous printing (NO in S1), the CPU 101 sets the timing T6, which is the timing of changing the transfer current applied to the transfer unit 5, to the timing T7 shown in FIG. 4 (S3). Then, the CPU 101 proceeds to the process of S4.

In response to determining that the print job includes an instruction for continuous printing (YES in S1), the CPU 101 calculates the timing T6 (S2). The CPU 101 calculates the timing T6 by adding the value VA, the value VB, the value VC, and the value VD to the timing T7. The CPU 101 changes the period P5 by changing the timing T6 according to the value VA, the value VB, the value VC, and the value VD. The processing of S2 will be specifically described with reference to FIG. 8.

As shown in FIG. 8, the CPU 101 acquires the conveyance speed of the sheet P from the ROM 102 and changes the value VA (S21). The conveyance speed of the sheet P is the speed at which the sheet P is conveyed by the conveyor 3 and is stored in the ROM 102. As shown in FIG. 11A, the ROM 102 stores the conveyance speed of the sheet P and the value VA in association with each other.

In a case where the conveyance speed of the sheet P acquired from the ROM 102 is a first speed, the CPU 101 sets the value VA to −35. In a case where the conveyance speed of the sheet P acquired from the ROM 102 is a second speed, the CPU 101 sets the value VA to −25. The first speed is faster than the second speed. The CPU 101 changes the current value VA to the set value VA.

After changing the value VA, the CPU 101 acquires the value VB from the ROM 102 based on the setting of the type of sheet P included in the print job (S22). As shown in FIG. 11B and FIG. 11C, the ROM 102 stores the type of sheet P and the value VB in association with each other.

In a case where the type of sheet P included in the print job is a thin sheet, the CPU 101 acquires −5 as the value VB. In a case where the type of sheet P included in the print job is a normal-thickness sheet or a thick sheet, the CPU 101 acquires 0 as the value VB. In a case where the type of sheet P included in the print job is a thicker sheet, the CPU 101 acquires 5 as the value VB.

As shown in FIG. 11C, in a case where the type of sheet P included in the print job is glossy paper or envelope, the CPU 101 acquires 5 as the value VB while ignoring the value VB shown in FIG. 11B.

Next, the CPU 101 determines whether the print job includes a setting of color printing (S23). In response to determining that the print job includes a setting of color printing (YES in S23), the CPU 101 proceeds to S26. In response to determining that the print job does not include a setting of color printing, that is, in response to determining that the print job includes a setting of monochrome printing (NO in S23), the CPU 101 determines whether the value VB is a positive value (S24).

In response to determining that the value VB is a positive value (YES in S24), the CPU 101 proceeds to S26. In response to determining that the value VB is 0 or less (NO in S24), the CPU 101 sets the value VB to 0 (S25). Then, the CPU 101 changes the current value VB to the acquired or set value VB (S26).

As shown in FIG. 9, after changing the value VB, the CPU 101 acquires the value VC based on the temperature and humidity detected by the temperature-humidity sensor 7

(S27). As shown in FIG. 11D, the ROM 102 stores the value VC in association with temperatures TE and humidities HU.

In a case where the humidity HU detected by the temperature-humidity sensor 7 is higher than or equal to 0% and lower than 30%, the CPU 101 acquires 5 as the value VC. In a case where the humidity HU detected by the temperature-humidity sensor 7 is higher than or equal to 30% and lower than 60%, the CPU 101 acquires 0 as the value VC. In a case where the humidity HU detected by the temperature-humidity sensor 7 is higher than or equal to 60%, the CPU 101 acquires −5 as the value VC.

In FIG. 11D, the value VC is the same in each temperature range, but the value VC may be different in each temperature range. In this case, the CPU 101 changes the value VC based on the temperature detected by the temperature-humidity sensor 7.

Next, the CPU 101 determines whether the print job includes a setting of color printing (S28). In response to determining that the print job includes a setting of color printing (YES in S28), the CPU 101 proceeds to S31. In response to determining that the print job does not include a setting of color printing, that is, in response to determining that the print job includes a setting of monochrome printing (NO in S28), the CPU 101 determines whether the value VC is a positive value (S29).

In response to determining that the value VC is a positive value (YES in S29), the CPU 101 proceeds to S31. In response to determining that the value VC is 0 or less (NO in S29), the CPU 101 sets the value VC to 0 (S30). Then, the CPU 101 changes the current value VC to the acquired or set value VC (S31).

After changing the value VC, the CPU 101 changes the current value VD to the value VD to be set, based on the print position (S32). The print position indicates the position where an image is printed on the sheet P corresponding to each of the transfer rollers 5Y, 5M, 5C, and 5K. As shown in FIG. 11E, the ROM 102 stores the value VD in association with the print position corresponding to each of the transfer rollers 5Y, 5M, 5C, and 5K.

In a case where the target transfer roller that is executing the process of S2 is the transfer roller 5Y or the transfer roller 5M, the CPU 101 sets the value VD to 0. In a case where the target transfer roller for which the process of S2 is being executed is the transfer roller 5C or the transfer roller 5K, the CPU 101 sets the value VD to 5.

After calculating the timing T6, which is timing of changing the transfer current, the CPU 101 changes the current timing T6 to the timing T6 calculated in S2 shown in FIG. 7 (S4). After changing the timing T6, the CPU 101 performs printing on the sheet P (S5). As described above, the CPU 101 executes the period changing process of changing the period P5 according to the humidity detected by the temperature-humidity sensor 7.

The electrical resistance of the sheet P changes depending on the humidity, and the easiness of flowing of the transfer current from the transfer unit 5 in an in-plane direction of the sheet P (a direction parallel to the surface of the sheet P) varies. Thus, the likelihood of occurrence of blurring and banding in the toner image transferred to the sheet P varies depending on the humidity. According to the above configuration, the CPU 101 changes, based on the humidity, the timing of changing the transfer bias applied to the transfer unit 5 from the first transfer bias to the second transfer bias.

As a result, a suitable amount of transfer current is supplied from the transfer unit 5 to the sheet P based on the humidity, and blurring that occurs in the toner image transferred to the sheet P is reduced. Since an appropriate amount of transfer current flows through the sheet P, changes in the surface potential of the photosensitive drums 41Y, 41M, 41C, and 41K are suppressed, and banding that occurs in the toner image transferred to the subsequent sheet P is reduced.

In a case where the image forming apparatus 1 is a color printer including a transfer member, which is the transfer unit 5 having the endless belt 53 and the transfer rollers 5Y, 5M, 5C, and 5K, blurring that occur in the toner image transferred to the sheet P and banding that occurs in the toner image transferred to the subsequent sheet P are reduced.

In S27, as shown in FIG. 11D, the higher the humidity detected by the temperature-humidity sensor 7, the smaller the value VC, the smaller (earlier) the timing T6, and the shorter the period P5. Thus, in S4, the CPU 101 changes the period P5 to a shorter value as the humidity detected by the temperature-humidity sensor 7 increases.

The higher the humidity, the smaller the electric resistance of the sheet P, and the more easily the transfer current flows in the in-plane direction of the sheet P from the transfer unit 5. Thus, the higher the humidity, the more likely a large transfer current flows through the sheet P, and the more likely banding occurs in the toner image transferred to the subsequent sheet P. Conversely, the lower the humidity, the higher the electric resistance of the sheet P, and the less the transfer current flows in the in-plane direction of the sheet P from the transfer unit 5. Thus, as the humidity decreases, a sufficiently large transfer current is less likely to flow through the sheet P, and blurring is more likely to occur in the toner image transferred to the sheet P.

According to the above configuration, as the humidity becomes higher, the timing of reducing the transfer current applied to the transfer unit 5 becomes earlier, and the transfer current flowing from the transfer unit 5 to the sheet P is reduced. Also, as the humidity becomes lower, the timing of reducing the transfer current applied to the transfer unit 5 becomes later, and the transfer current flowing from the transfer unit 5 to the sheet P increases. Thus, blurring that occurs in the toner image transferred to the sheet P and banding that occurs in the toner image transferred to the subsequent sheet P are reduced.

In S22, as shown in FIGS. 11B and 11C, the value VB differs depending on the type of sheet P included in a print job, and thus the timing T6 also becomes different. Thus, the period P5 is changed based on the type of sheet P included in the print job. Thus, in S4, the CPU 101 changes the period P5 based on the type of sheet P included in the print job.

Depending on the type of the sheet P, the electrical resistance of the sheet P may differ. According to the above configuration, the timing of reducing the transfer current applied to the transfer unit 5 is changed according to the type of sheet P. Thus, a suitable amount of transfer current is applied to the sheet P according to the type of the sheet P, and blurring that occurs in the toner image transferred to the sheet P and banding that occurs in the toner image transferred to the subsequent sheet P are reduced.

In S22, as shown in FIG. 11B, the thinner the sheet P, the smaller the value VB, and the smaller (earlier) the timing T6, and the shorter the period P5. Thus, in S4, the CPU 101 changes the period P5 to a shorter value as the thickness of the sheet P decreases.

As the thickness of the sheet P becomes thinner, a less transfer current flows from the sheet P to the surface of the photosensitive drum, and a transfer current is more likely to concentrate on the trailing end PB of the sheet P. Thus, banding is likely to occur in the toner image transferred to the subsequent sheet P. Conversely, as the thickness of the sheet P becomes thicker, a more transfer current flows from the sheet P to the surface of the photosensitive drum, and a less transfer current flows to the trailing end PB of the sheet P. Thus, blurring is likely to occur in the toner image transferred to the sheet P. According to the above configuration, as in the case where the period P5 is changed to a shorter value as the humidity increases, blurring that occurs in the toner image transferred to the sheet P and banding that occurs in the toner image transferred to the subsequent sheet P are reduced.

In S21, as shown in FIG. 11A, the value VA in a case where the conveyance speed of the sheet P is the first speed is smaller than the value VA in a case where the conveyance speed of the sheet P is the second speed. Thus, the timing T6 becomes smaller (earlier), and the period P5 becomes shorter. Thus, since the first speed is faster than the second speed, in S4 the CPU 101 changes the period P5 to a shorter value as the conveyance speed of the sheet P is faster.

The timing of reducing the transfer current applied to the transfer unit 5 is determined as an appropriate timing based on the conveyance speed of the sheet P. Thus, blurring that occurs in the toner image transferred to the sheet P and banding that occurs in the toner image transferred to the subsequent sheet P are reduced.

In S32, as shown in FIG. 11E, among the plurality of transfer rollers 5Y, 5M, 5C, and 5K, the transfer rollers 5C and 5K arranged on the downstream side in the sheet conveyance direction have a large value VD. Thus, the timing T6 also becomes a large (later) value, and the period P5 becomes a long value.

Thus, in S4, among the period P5 determined for each of the plurality of transfer rollers 5Y, 5M, 5C, and 5K, the CPU 101 sets the period P5 to a long value for the transfer rollers 5C and 5K arranged on the downstream side in the sheet conveyance direction. Here, the period P5 set to a long value by the CPU 101 is the period P5 determined at the time when the process of S31 is completed.

When the sheet P is conveyed, transfer currents flowing from the transfer rollers 5Y, 5M, 5C, and 5K to the sheet P flow in the direction opposite to the sheet conveyance direction. Thus, transfer currents flow from the transfer rollers 5C and 5K arranged on the downstream side in the sheet conveyance direction, through the sheet P, to the surfaces of the photosensitive drums 41Y and 41M arranged on the upstream side in the sheet conveyance direction. Thus, a larger transfer current flows in the upstream portion of the sheet P than in the downstream portion in the sheet conveyance direction. On the other hand, banding is less likely to occur in a toner image formed on the downstream side portion of the sheet P in the sheet conveyance direction.

According to the above configuration, for the period P5 determined for each of the plurality of transfer rollers 5Y, 5M, 5C, and 5K, the CPU 101 sets the period P5 to a long value for the transfer rollers 5C and 5K arranged on the downstream side in the sheet conveyance direction, among the plurality of transfer rollers 5Y, 5M, 5C, and 5K. Thus, the transfer current applied to the transfer rollers 5C and 5K arranged on the downstream side in the sheet conveyance direction is increased, and blurring that occurs on the downstream side in the sheet conveyance direction is efficiently reduced.

Compared with the other transfer rollers 5Y, 5M, and 5K, blurring is most likely to occur at a portion of the sheet P where a toner image is transferred by the transfer roller 5C. Banding is less likely to occur at the portion of the sheet P where a toner image is transferred by the transfer roller 5C. This is because, among the photosensitive drums 41Y, 41M, 41C, and 41K, only the photosensitive drum 41K is arranged downstream of the photosensitive drum 41C in the sheet conveyance direction, and a small transfer current flows to the portion of the sheet P where a toner image is transferred by the transfer roller 5C. Thus, it is advantageous that the timing of reducing the transfer current applied to the transfer roller 5C is delayed.

At a portion of the sheet P where a toner image is transferred by the transfer roller 5M, banding is likely to occur and blurring is less likely to occur. This is because transfer currents from the transfer rollers 5C and 5K flow to the portion of the sheet P where the toner image is transferred by the transfer roller 5M. Thus, it is advantageous that the timing of reducing the transfer current applied to the transfer roller 5M is earlier.

Further, banding is likely to occur at a portion of the sheet P where a toner image is transferred by the transfer roller 5Y This is because transfer currents from the transfer rollers 5M, 5C, and 5K flow to the portion of the sheet P where the toner image is transferred by the transfer roller 5Y However, in a case where the toner image is yellow, the banding is difficult to recognize.

In the case of NO in S23, that is, when the print job includes a setting for monochrome printing and the value VB is negative, the value VB is set to 0 by S24 and S25. Thus, when the value VB is negative and the print job includes a setting for monochrome printing, the period P5 becomes a longer value than when the value VB is negative and the print job includes a setting for color printing.

Thus, in S4, the CPU 101 changes the period P5 to a longer value when the print job includes a setting for monochrome printing than when the print job includes a setting for color printing.

Since the transfer roller 5K for transferring a black toner image to the sheet is arranged on the most downstream side in the sheet conveyance direction, no transfer current flows from the other transfer rollers to the portion of the sheet P where the transfer roller 5K transfers a toner image. Thus, banding is less likely to occur in the black toner image.

In a case where the print job includes a setting for monochrome printing, only a black toner image is transferred onto the sheet P, so there is no need to consider the occurrence of banding in toner images of other colors. Thus, by delaying the timing of reducing the applied transfer current, the transfer current flowing from the transfer roller 5K to the sheet P is increased, and blurring occurring in the black toner image is efficiently reduced.

Modification 1

In S4, the CPU 101 may change the period P5 to a shorter value as the electrical resistance of the sheet P decreases. As the electric resistance of the sheet P decreases, a larger transfer current flows through the sheet P and banding is more likely to occur in the toner image transferred to the subsequent sheet P. Conversely, as the electrical resistance of the sheet P increases, a sufficiently large transfer current is less likely to flow through the sheet P and blurring is more likely to occur in the toner image transferred to the sheet P.

According to the above configuration, the smaller the electrical resistance of the sheet P, the earlier the timing of reducing the transfer current applied to the transfer unit 5. Further, the greater the electrical resistance of the sheet P, the later the timing of reducing the transfer current applied to the transfer unit 5. Thus, blurring that occurs in the toner image transferred to the sheet P and banding that occurs in the toner image transferred to the subsequent sheet P are reduced.

The CPU 101 may acquire the electrical resistance of the sheet P based on the magnitude of the transfer current flowing in the transfer unit 5 in a state where a toner image is being transferred to the sheet P by the transfer unit 5. A specific description will be given below. The image forming apparatus 1 includes a transfer current detection circuit (not shown) that detects a transfer current flowing in each of the transfer rollers 5Y, 5M, 5C, and 5K. The transfer current detection circuit outputs the detected transfer current to the CPU 101.

The CPU 101 calculates the electrical resistance of the sheet P from the magnitude of the transfer current detected by the transfer current detection circuit, thereby acquiring the electrical resistance of the sheet P. When the electrical resistance of the sheet P differs, the magnitude of the transfer current that flows in the transfer unit 5 also differs. Thus, the CPU 101 acquires the electrical resistance of the sheet P based on the magnitude of the transfer current.

The ROM 102 may store table information representing a correspondence between the type of the sheet P and the electrical resistance of the sheet P. In this case, the CPU 101 selects the electrical resistance of the sheet P from the table information stored in the ROM 102, based on the type of the sheet P included in the print job. Since the ROM 102 stores the table information representing the correspondence between the type of the sheet P and the electrical resistance of the sheet P, the CPU 101 selects, from the table information, the electrical resistance of the sheets P corresponding to the type of the sheet P included in the print job.

Modification 2

In S4, the CPU 101 may change the period P5 to a shorter value as the width of the sheet P included in the print job increases. As the width of the sheet P increases, the electric resistance of the sheet P decreases, a transfer current flows more easily from the transfer unit 5 in the in-plane direction of the sheet P, and banding is more likely to occur in the toner image transferred to the subsequent sheet P. Conversely, the width of the sheet P decreases, the electrical resistance of the sheet P increases, a less transfer current flows from the transfer unit 5 in the in-plane direction of the sheet P, and blurring is likely to occur in the toner image transferred to the sheet P.

According to the above configuration, as the width of the sheet P increases, the timing of reducing the transfer current applied to the transfer unit 5 becomes earlier, which reduces the transfer current flowing from the transfer unit 5 to the sheet P. Further, as the width of the sheet P decreases, the timing of reducing the transfer current applied to the transfer unit 5 is delayed, so that the transfer current flowing from the transfer unit 5 to the sheet P is increased. Thus, blurring that occurs in the toner image transferred to the sheet P and banding that occurs in the toner image transferred to the subsequent sheet P are reduced.

Modification 3

When a print job includes a setting of duplex (double-sided) printing, the CPU 101 executes a first transfer process of transferring a toner image to a first surface of a sheet P by the transfer unit 5. The CPU 101 also executes a fixing process of fixing the toner image transferred to the first surface of the sheet P by the transfer unit 5 onto the first surface of the sheet P by the fuser 6.

After executing the fixing process, the CPU 101 causes the sheet P to be turned over by conveying the sheet P along a duplex conveyance path (not shown) by the conveyor 3, and conveys the sheet P to the photosensitive drum 41Y by the conveyor 3. The duplex conveyance path is a path that branches from between the fuser 6 and the conveyance roller 33 and merges to a position between the feed roller 31 and the first sheet sensor 8.

The CPU 101 executes a second transfer process of transferring, by the transfer unit 5, a toner image to a second surface opposite to the first surface of the sheet P on which the toner image is fixed on the first surface of the sheet P. When executing the second transfer process, in S4 the CPU 101 changes the period P5 to a longer value than when a print job includes a setting of single-sided printing.

When printing has been completed on the first surface of the sheet P, the sheet P is heated by the fuser 6 and thus the amount of water contained in the sheet P decreases and the electrical resistance of the sheet P increases. When duplex printing is performed on the sheet P, after the sheet P heated by the fuser 6 is turned over, a toner image is transferred to the sheet P of which the electrical resistance is increased, which reduces the transfer current that flows from the transfer unit 5 in the in-plane direction of the sheet P.

According to the above configuration, when the print job includes a setting for duplex printing and the second transfer process is executed, the timing of reducing the transfer current applied to the transfer unit 5 is delayed, which increases the transfer current that flows from the transfer unit 5 to the sheet P. Thus, blurring that occurs in the toner image transferred to the sheet P is reduced.

Modification 4

The image forming apparatus 1 may be a monochrome printer. In this case, the print engine 4 of the image forming apparatus 1 includes one photosensitive drum 41K, one development device 42K, and an exposure device 44. Further, the image forming apparatus 1 includes one transfer roller 5K instead of the transfer unit 5. The one transfer roller 5K is an example of a transfer member.

In a case where the image forming apparatus 1 is a monochrome printer including a transfer member that is the ion-conductive transfer roller 5K, blurring and banding that occur in a toner image transferred to the sheet P are reduced.

Modification 5

In the case of YES in S1, the CPU 101 may determine whether the target to be printed is the sheet P of the last page. In response to determining that the target to be printed is the sheet P of the last page, the CPU 101 proceeds to the process in S3. In response to determining that the target to be printed is not the sheet P of the last page, the CPU 101 proceeds to the process in S2. As mentioned above, banding occurs in the subsequent sheet. When printing is performed on the sheet P of the last page, the subsequent sheet does not exist and thus there is no need to change the timing of reducing the transfer current applied to the transfer unit 5.

Other Modifications

The photosensitive drums in the above-described embodiment are positively charged organic photoreceptors. Alternatively, the photosensitive drums may be negatively charged organic photoreceptors.

The transfer member in the above-described embodiment is a belt unit in which a polyamide belt is stretched between the drive roller 51 and the follow roller 52 (idle roller). The material of the belt may be other materials, such as elastomers.

The temperature-humidity sensor 7 in the above-described embodiment is a composite temperature-humidity sensor capable of measuring both temperature and humidity. The humidity sensor may be an electrical-resistance-type humidity sensor, or may be a capacitance-type humidity sensor. The humidity sensor may be a single sensor element, or may be a sensor unit in which a sensor element and a measurement unit such as an AD converter are integrated into one IC.

The sheet sensor 8, 9 in the above-described embodiment is a contact sensor that includes an actuator configured to contact a sheet and that detects the sheet based on the movement of the actuator. Alternatively, the sheet sensor may be a non-contact sensor that detects a sheet without contacting the sheet, such as an optical sensor or an ultrasonic sensor, for example.

The controller in the above-described embodiment includes a composite IC in which a processor, a memory, and various controllers are integrated into one package. The controller may be a controller having individual ICs for each function.

[Example of Implementation by Software]

The functions of the image forming apparatus 1 (hereinafter referred to as "apparatus") may be realized by a program for causing a computer to function as the apparatus, the program for causing the computer to function as the CPU 101 of the apparatus.

In this case, the apparatus includes a computer having at least one controller (for example, a processor) and at least one storage device (for example, a memory) as hardware for executing the program. By executing the above program using the controller and the storage device, each function described in the above embodiment is realized.

The program may be recorded on one or more non-transitory computer-readable recording (storage) medium. The recording medium may or may not be included in the apparatus. In the latter case, the program may be supplied to the apparatus via any wired or wireless transmission medium.

A part or all of the functions of the above control blocks may be realized by logic circuits.

For example, an integrated circuit in which logic circuits functioning as the above control blocks are formed is also included in the scope of the present disclosure. In addition, the functions of the above control blocks may be realized by, for example, a quantum computer.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. An image forming apparatus comprising:

a photosensitive drum;

a transfer member including at least a transfer roller or a transfer belt, a transfer nip being formed between the transfer member and the photosensitive drum, the transfer member being configured to transfer a toner image formed on the photosensitive drum to a sheet that passes through the transfer nip, the transfer member being configured to receive a transfer bias;

a humidity sensor configured to detect humidity;

a sheet sensor arranged upstream of the transfer member in a sheet conveyance direction, the sheet sensor being configured to detect a trailing end of the sheet; and a controller configured to:

calculate a particular period, the particular period being different depending on the humidity detected by the humidity sensor;

apply a first transfer bias to the transfer member in a state where a toner image is being transferred to the sheet by the transfer member;

detect a first timing which is a timing of detecting the trailing end of the sheet by the sheet sensor; and at a second timing which is the particular period after the first timing, change the transfer bias from the first transfer bias to a second transfer bias regardless of the humidity, the second transfer bias having a smaller absolute value than the first transfer bias, the second timing being a timing before the trailing end of the sheet exits the transfer nip, the second transfer bias being a bias that is applied to the transfer member when the trailing end of the sheet passes through the transfer nip.

2. The image forming apparatus according to claim 1, wherein the controller is configured to calculate the particular period to be a shorter value as the humidity detected by the humidity sensor increases.

3. The image forming apparatus according to claim 1, wherein the controller is configured to calculate the particular period to be a shorter value as an electrical resistance of the sheet decreases.

4. The image forming apparatus according to claim 3, wherein the controller is configured to acquire the electrical resistance of the sheet based on magnitude of a transfer current that flows in the transfer member in a state where a toner image is being transferred to the sheet by the transfer member.

5. The image forming apparatus according to claim 3, further comprising a memory storing table information representing a correspondence between a type of a sheet and the electrical resistance of the sheet, wherein the controller is configured to select the electrical resistance of the sheet from the table information stored in the memory, based on the type of the sheet included in a print job.

6. The image forming apparatus according to claim 1, wherein the controller is configured to calculate the particular period based on a type of the sheet included in a print job.

7. The image forming apparatus according to claim 1, wherein the controller is configured to calculate the particular period to be a shorter value as a width of the sheet included in a print job increases.

8. The image forming apparatus according to claim 1, further comprising a fuser configured to thermally fix a toner image transferred to the sheet by the transfer member to the sheet, wherein the controller is configured to, in a case where a print job includes a setting of duplex printing:

control the transfer member to transfer a toner image to a first surface of the sheet;

control the fuser to fix the toner image transferred to the first surface of the sheet by the transfer member to the first surface of the sheet; and control the transfer member to transfer a toner image to a second surface of the sheet, the second surface being a surface opposite to the first surface on which the toner image is fixed; and wherein the controller is configured to, when transferring the toner image to the second surface of the sheet, calculate the particular period to be a longer value than a case where the print job includes a setting of single-sided printing.

9. The image forming apparatus according to claim 1, wherein the controller is configured to calculate the particular period to be a shorter value as a conveyance speed of the sheet increases.

10. The image forming apparatus according to claim 1, wherein the transfer member is an ion-conductive transfer roller.

11. The image forming apparatus according to claim 1, wherein the transfer member is a transfer unit including:

an endless belt; and a transfer roller provided at an inner peripheral side of the endless belt, the transfer roller being configured to press the endless belt toward the photosensitive drum.

12. The image forming apparatus according to claim 11, wherein the photosensitive drum includes a plurality of photosensitive drums arranged along the sheet conveyance direction;

wherein the transfer roller includes a plurality of transfer rollers facing respective ones of the plurality of photosensitive drums; and wherein the controller is configured to:

change the transfer bias to be applied to each of the plurality of transfer rollers from the first transfer bias to the second transfer bias; and for the particular period determined for each of the plurality of transfer rollers, calculate the particular period to be a longer value for the transfer roller arranged downstream in the sheet conveyance direction, among the plurality of transfer rollers.

13. The image forming apparatus according to claim 12, wherein the transfer roller configured to transfer a black toner image to the sheet is arranged most downstream in the sheet conveyance direction among the plurality of transfer rollers; and wherein the controller is configured to:

in a case where a print job includes a setting for monochrome printing, calculate the particular period to be a longer value than a case where the print job includes a setting for color printing.

14. A control method of an image forming apparatus comprising a photosensitive drum, a transfer member configured to transfer a toner image formed on the photosensitive drum to a sheet that passes through a transfer nip formed between the photosensitive drum and the transfer member, the transfer member being configured to receive a transfer bias, a humidity sensor configured to detect humidity, and a sheet sensor arranged upstream of the transfer member in a sheet conveyance direction, the sheet sensor being configured to detect a trailing end of a sheet, the control method comprising:

calculating a particular period, the particular period being different depending on the humidity detected by the humidity sensor;

applying a first transfer bias to the transfer member in a state where a toner image is being transferred to the sheet by the transfer member;

detecting a first timing which is a timing of detecting the trailing end of the sheet by the sheet sensor; and at a second timing which is the particular period after the first timing, changing the transfer bias from the first transfer bias to a second transfer bias regardless of the humidity, the second transfer bias having a smaller absolute value than the first transfer bias, the second timing being a timing before the trailing end of the sheet exits the transfer nip, the second transfer bias being a bias that is applied to the transfer member when the trailing end of the sheet passes through the transfer nip.

15. The control method according to claim 14, wherein the calculating the particular period includes calculating the particular period to be a shorter value as the humidity detected by the humidity sensor increases.

16. The control method according to claim 14, wherein the calculating the particular period includes calculating the particular period to be a shorter value as an electrical resistance of the sheet decreases.

17. The control method according to claim 16, further comprising acquiring the electrical resistance of the sheet based on magnitude of a transfer current that flows in the transfer member in a state where a toner image is being transferred to the sheet by the transfer member.

18. The control method according to claim 16, wherein the image forming apparatus further comprises a memory storing table information representing a correspondence between a type of a sheet and the electrical resistance of the sheet; and wherein the control method further comprises selecting the electrical resistance of the sheet from the table information stored in the memory, based on the type of the sheet included in a print job.

19. The control method according to claim 14, wherein the calculating the particular period includes calculating the particular period based on a type of the sheet included in a print job.

20. The control method according to claim 14, wherein the calculating the particular period includes calculating the particular period to be a shorter value as a width of the sheet included in a print job increases.

* * * * *